United States Patent

Wilson

[15] 3,673,966
[45] July 4, 1972

[54] ELECTRIC GUIDEWAY TRANSPORTATION SYSTEM

[72] Inventor: David G. Wilson, Cambridge, Mass.

[73] Assignee: Massachusetts Institute of Technology, Cambridge, Mass.

[22] Filed: Nov. 24, 1969

[21] Appl. No.: 879,318

[52] U.S. Cl. ............................104/1 R, 104/48, 104/50, 104/119, 104/148 R, 104/243, 104/245, 105/1 A, 105/29 R, 105/30, 105/49, 105/133, 105/144, 191/29, 318/171

[51] Int. Cl. ...................B60s 13/02, B61b 13/02, B61i 1/10

[58] Field of Search .....................104/48, 134, 1 R, 50, 119, 104/148 R, 243, 245; 105/29 R, 1 R, 1 A, 30, 49, 133, 144; 318/171; 191/29

[56] References Cited

UNITED STATES PATENTS

| | | | |
|---|---|---|---|
| 594,832 | 11/1897 | Leland | 105/29 R |
| 1,366,292 | 1/1921 | Smith | 104/48 |
| 3,221,668 | 12/1965 | Munck | 105/29 R |
| 3,452,683 | 7/1969 | Grebe | 105/29 R |
| 3,084,766 | 4/1963 | Donaldson | 105/29 R X |
| 3,148,320 | 9/1964 | Davis | 318/171 |
| 3,164,103 | 1/1965 | Lathers et al. | 104/134 |

*Primary Examiner*—Arthur L. La Point
*Assistant Examiner*—Howard Beltran
*Attorney*—Thomas Cooch, Martin M. Santa and Lawrence Gilbert

[57] ABSTRACT

A palletized automated transport vehicle is propelled and controlled along a guideway by means of a vertical rotary synchronous motor in combination with a vertical cog drive. The motor is fixed to the vehicle; the cog drive is supported by the guideway. The combination allows the vehicle to be driven at a constant or variable speed, and to be controlled with respect to headway or position, and therefore, with respect to other vehicles along the guideway.

6 Claims, 2 Drawing Figures

PATENTED JUL 4 1972

INVENTOR:
DAVID G. WILSON
BY Laurence Gilbert
ATTORNEY

3,673,966

ELECTRIC GUIDEWAY TRANSPORTATION SYSTEM

BACKGROUND OF INVENTION

1. Field

The present invention relates to automated transportation systems and in particular to automated transport vehicles.

2. Description of the Prior Art

Presently proposed automatic-transport systems have considered the use of propulsion systems whose power or speed could be modulated by a headway-sensing system. Another alternative has been to sense an error signal resulting from the difference between the speed of an individual vehicle and the designed system speed. This error signal would then modulate the power supply to maintain the position, and therefore the speed, of the vehicle irrespective of the location of other vehicles. The percentage regulation of such control then becomes a spacing consideration.

Linear synchronous motors are presently being experimented with as a means of propelling an automated transport vehicle. However, the linear synchronous motor is, at present, in an early state of development, and has uncertainty regarding no-load losses. Coils mounted in a comparatively light-weight structure might cause the whole guideway to hum.

Since in electric motors of any variety the forces produced at the rotor periphery are a function of the iron and copper investment and only a small function of speed, it is advantageous to use the highest peripheral speed consistent with inductive and windage losses and mechanical strength. A disadvantage of the linear synchronous motor stems from the fact that the peripheral speed of the motor is limited to the speed of the vehicle.

SUMMARY

Figure 1:
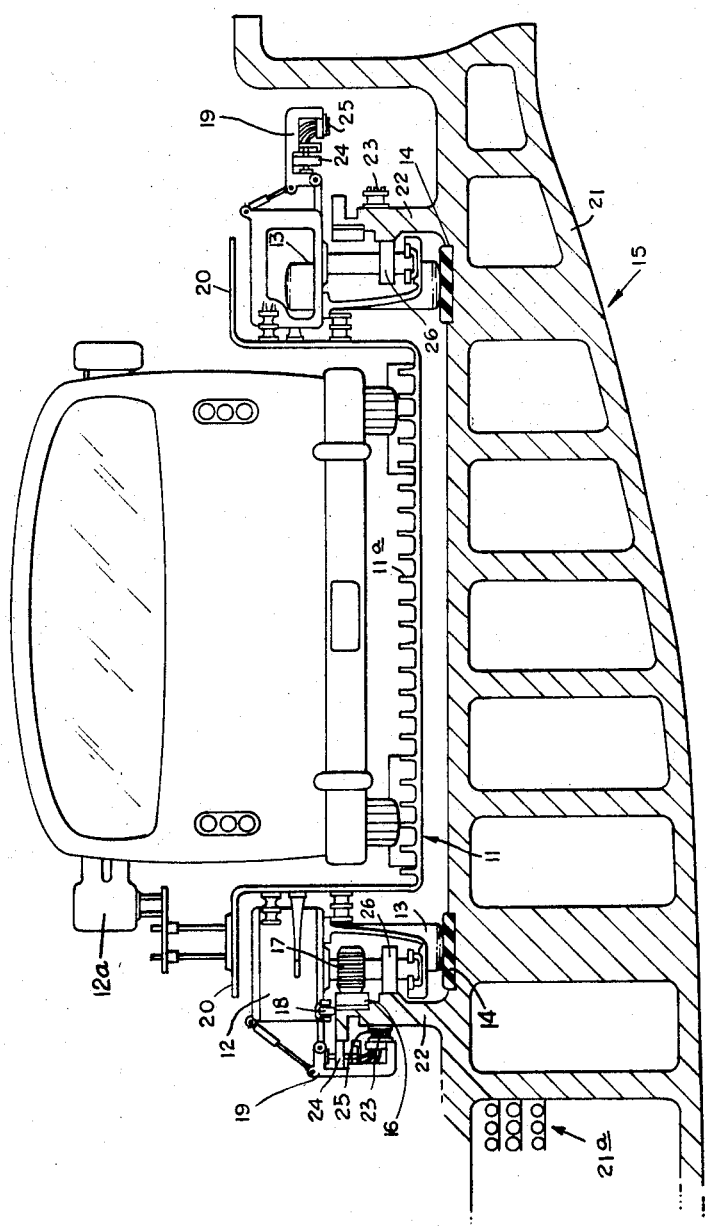
FIG. 1 is an elevational view of the pallet.

It is an object of the invention to propel a palletized transport vehicle along a guideway serving as a roadbed at a fixed speed and to control it such that it is in fixed position with respect to other vehicles along the guideway.

It is a further object of the invention to combine the propulsion and control of the vehicle in one system, the rotary synchronous motor.

The objects are accomplished by a pallet having a frame supported by a plurality of wheels adapted to receive an object, a rotary synchronous electric motor mounted to said frame of said pallet, and means for utilizing said rotary synchronous motor to propel said vehicle along said guideway.

Other objects and a fuller understanding of the invention may be had by referring to the following description and claims taken in conjunction with the accompanying drawing.

DESCRIPTION OF THE PREFERRED EMBODIMENT

The palletized automated transport vehicle or pallet is designed to carry ordinary road vehicles or passenger and cargo containers within certain size and weight limits which are driven or are loaded onto it.

The driving and control system of the pallet involves a revolutionary combination of two old ideas: the rotary synchronous motor and the cog-drive railroad. This combination provides savings in control costs; increased reliability, partly because of simplification and partly because of the non-slip characteristics of the system when water or ice or oil is on the track or rack gear; and the ability to negotiate gradients that are impossible with wheel-to-track adhesion.

A rotary synchronous motor is preferred because of its exact relation between speed and supply frequency and because, in comparison with the linear synchronous motor, it is an available, proven, efficient and reliable component.

A vertical cog drive is preferred because of the inherent self-cleaning characteristics when snow, ice or debris are encountered. The rack gear is placed to the left of the vehicle to simplify switching of the vehicle to the right on and off the guideway in the case of U.S.A. road convention. Obviously, the gear would be placed to the right of the vehicle to simplify switching to the left in the case of British road convention.

Accordingly, propulsion is by vertical or near-vertical synchronous motor fixed to the left-hand side of the pallet when the vehicle is driven and exited from the right-hand side of the guideway. Two motors are available, one at each end of the pallet, each motor being capable of delivering the full maximum power required for acceleration and normal-speed operation. Since peak power for acceleration will be required for only a few seconds, the motor design is such that in emergency operation with one motor out the acceleration power under the most adverse conditions possible will be able to be met comfortably on short-time rating. As a further safeguard, each motor pinion meshes with a separate rack gear. Each motor and pinion has two degrees of freedom: fore and aft through a distance of one or more tooth pitches, and sideways to accommodate misalignments between sections of the guiderail. Both drives are mounted on one side of the pallet to avoid problems in turning corners.

Figure 2:
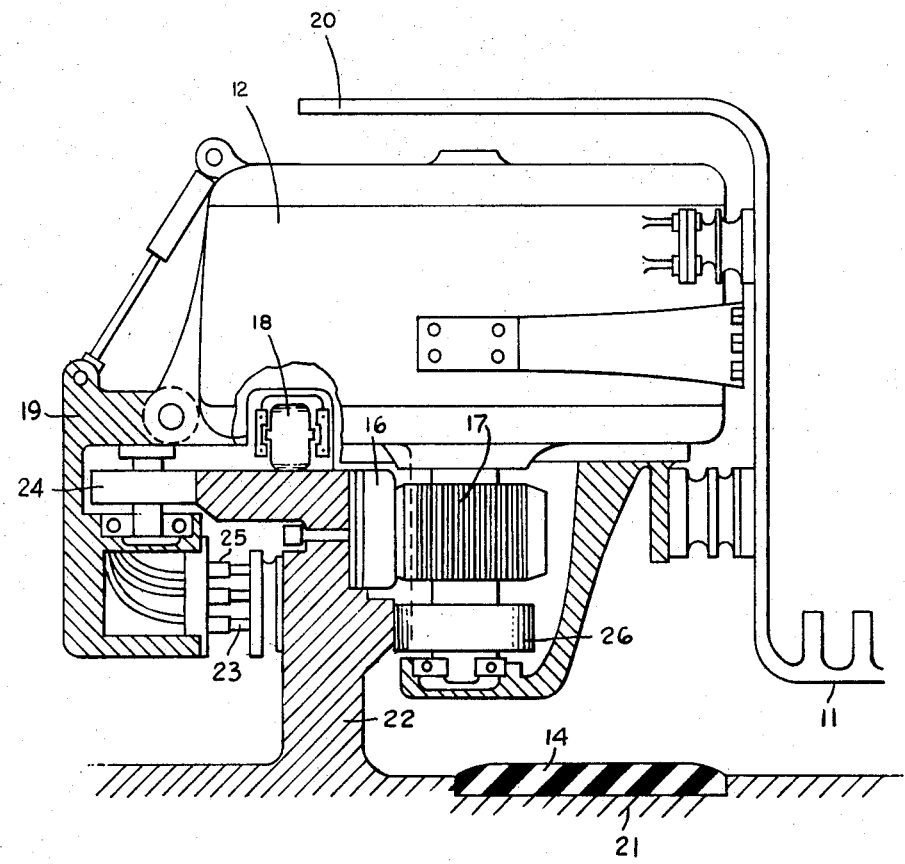
FIG. 2 shows the rotary synchronous motor mounted to the pallet and the rack gear mounted to the guiding strip of the guideway, the pinion of the motor being in engagement with the rack gear.

Referring to FIGS. 1 and 2, the automated transport vehicle comprises a pallet 11 having a floor with longitudinal ribs 11a. A rotary synchronous motor 12 having a programmed routing control system 12a is fixed to the left-hand side of the frame 20 of the pallet such that the axis of rotation of the motor shaft is about the vertical. Pallet 11 is supported by unflanged steel wheels 13 which are adapted to roll on a longitudinally extending bearing surface which might, for instance, be a resilient neoprene pad 14 mechanically fastened and bonded to guideway 15. Guideway 15 is comprised of a concrete roadbed 21 having service pipelines 21a and a guide wall 22 which support vertical rack gear 16 on one side of the strip and power rails 23 on the other. A pinion 17 which is fixed to the motor shaft is positioned vertically by roller 18 carried by the motor housing to engage the rack gear. Spacing roller 26 provides a sideways alignment between the rack gear and pinion. Guidance and pickup arm 19, which initially is in the down position, includes the guidance roller 24 and power pickup brushes 25. Guidance roller 24 is fixed to the brush pickup arm 19 to engage the edge of a laterally extending shelf of the guide wall to cause the power pickup brushes 25 to mate with respective power rails 23. Roller 26 is carried by the pallet and guidingly engages the edge of a laterally extending shelf of the guide wall, opposed to the direction of engagement of roller 24. Power pickup brushes 25 are connected to the motor windings by flexible wiring cable as shown. Rollers 18, 24, and 26 provide the necessary constraints to keep the pinion aligned and engaged with the rack gear.

In operation, power is transmitted through the power pickup to the motor causing the motor shaft to rotate at a speed dependent on the frequency of the input voltage. Synchronous operation from rest may be achieved by separate excitation of the motor field (or permanent magnets), together with controlled increase of the supply frequency, or by standard induction windings and constant supply frequency. The pinion 17 and rack gear 16 form a vertical-cog drive system which serves to propel the pallet along the guideway at a speed determined by the frequency applied to the synchronous motor. A constant frequency will produce a constant speed. A variable frequency will produce a variable speed. In this manner a synchronous motor in combination with a vertical-cog drive serves both as the means of propulsion and as a position controller with respect to other pallets that may be fore and aft of the above-described pallet. Since the synchronous motor has the ability to maintain phase, position is maintained in the case of either a constant-frequency or a variable-frequency input, except in the case of starting from rest inductively, as mentioned above.

Although suspension of the pallet is preferably by means of the unflanged steel wheels described hereinabove, the wheels could be made of aluminum alloy or magnesium or could be flanged as well as unflanged. The wheels could also be pneumatic or solid-rubber tired.

The cog-drive system preferably uses a resilient rack gear made of reinforced synthetic rubber shrouded for quietness. The rack gear could be metallic or non-metallic, elastomeric or rigid, and continuous or of discrete length. The pinion is preferably made of any suitable metal such as steel.

The rollers are preferably made of steel but could be rubber-tired or nylon.

The pallet frame is preferably made of aluminum or steel alloy and includes means for rapid loading of vehicles such as longitudinal or transverse ribs.

The supply is preferably constant frequency over the majority of the guideway but could be varied either for individual pallets by an appropriate variable-frequency supply to sections of the guideway or for the entire guideway to allow for individual pallet acceleration and retardation at exits, entrances, and curves, and to allow for shut-down, start-up and speed change of the entire guideway loop.

While the invention has been described in detail in the foregoing specification and the drawing similarly illustrates the same, the aforesaid is by way of illustration only and is not restrictive in character.

What is claimed is:

1. A transport system comprising a guideway and a load carrying pallet; said pallet having a plurality of wheels; said guideway comprising a roadbed having a longitudinally extending vertically rising guide wall and a gear rack carried by said guide wall to be engaged by a pinion for driving said pallet; electrical power rails carried by said guide wall; said pallet having a rotary synchronous motor and said motor having a drive pinion to engage said gear rack; electrical pickup means comprising a pickup arm having electrical pickup brushes carried by said pallet to engage said power rails; a first roller means carried by said pallet and engaging said guide wall at one side thereof for lateral guidance and positioning of said pinion with said gear rack.

2. A transport system as set forth in claim 1, including a second roller means carried by said pickup arm and engaging said guide wall at the opposite side thereof for guiding the movement of said pickup arm.

3. A transport system as set forth in claim 2, said pickup arm being pivotally mounted to said pallet so as to be swung to disengage said brushes from said rails.

4. A transport system as set forth in claim 2, including a third roller means carried by said pallet for vertical support thereof on a top edge of said guide wall.

5. A transport system as set forth in claim 4, said guide wall being at one side of said roadbed; and all said roller means being at one side of said pallet; and another guide wall at the opposite side of said roadbed and an additional first, second and third roller means at the opposite side of said pallet, coacting with said latter guide wall in the manner described for said first mentioned first, second and third roller means.

6. A transport system as set forth in claim 4, including elongated resilient pads incorporated in said roadbed for support surfaces for the wheels of said pallet.

* * * * *